United States Patent
Abernathy et al.

(10) Patent No.: US 7,313,673 B2
(45) Date of Patent: Dec. 25, 2007

(54) FINE GRAINED MULTI-THREAD DISPATCH BLOCK MECHANISM

(75) Inventors: Christopher Michael Abernathy, Austin, TX (US); Jonathan James Dement, Austin, TX (US); Albert James Van Norstrand, Jr., Round Rock, TX (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 11/154,158

(22) Filed: Jun. 16, 2005

(65) Prior Publication Data

US 2006/0288192 A1 Dec. 21, 2006

(51) Int. Cl.
*G06F 9/30* (2006.01)
(52) U.S. Cl. ...................... 712/214; 712/219
(58) Field of Classification Search ............... 712/214, 712/216, 219, 225
See application file for complete search history.

(56) References Cited

U.S. PATENT DOCUMENTS

| | | | |
|---|---|---|---|
| 5,584,031 A * | 12/1996 | Burch et al. ............... | 713/323 |
| 6,341,347 B1 | 1/2002 | Joy et al. | |
| 2006/0031704 A1* | 2/2006 | Hayashi ...................... | 713/600 |
| 2006/0190703 A1* | 8/2006 | Carrie ........................ | 712/214 |

* cited by examiner

Primary Examiner—William M. Treat
(74) Attorney, Agent, or Firm—Carr LLP; D'Ann N. Rifai

(57) ABSTRACT

The present invention provides a method, a computer program product, and an apparatus for blocking a thread at dispatch in a multi-thread processor for fine-grained control of thread performance. Multiple threads share a pipeline within a processor. Therefore, a long latency condition for an instruction on one thread can stall all of the threads that share the pipeline. A dispatch-block signaling instruction blocks the thread containing the long latency condition at dispatch. The length of the block matches the length of the latency, so the pipeline can dispatch instructions from the blocked thread after the long latency condition is resolved. In one embodiment the dispatch-block signaling instruction is a modified OR instruction and in another embodiment it is a Nop instruction. By blocking one thread at dispatch, the processor can dispatch instructions from the other threads during the block.

20 Claims, 5 Drawing Sheets

FINE GRAINED MULTI-THREAD DISPATCH BLOCK MECHANISM

FIELD OF THE INVENTION

The present invention relates generally to a block mechanism in multi-thread processors, and more particularly, to a dispatch block mechanism to allow fine-grained control of thread performance.

DESCRIPTION OF THE RELATED ART

Multi-thread technology allows two or more separate threads to execute on the same single processing core. A thread is a part of a program or a group of instructions that can execute independently. Accordingly, a group of instructions in a single thread must execute in program order, whereas a group of instructions in separate threads can execute independently, and concurrently. Multiple threads within a processor enable the processor to better utilize its resources. Multi-thread technology allows a single processor to appear as two or more processors to software.

Ideally, each thread would operate independently on its own resources. Each thread would utilize its own instruction pipelines and units, execution pipelines and units, and the like. In practice, this type of implementation is not feasible because there is a limited area and amount of resources on the chip. Therefore, different threads have to share some resources. For example, multiple threads may share the same instruction issue unit or execution pipeline. With multi-thread processors, issues involving sharing resources, handling instruction dependencies, and determining the priority of access to the resources become problematic for performance since a resource "bottleneck" is created.

The problem with sharing resources between threads is that an instruction with a long latency on one thread can stall the execution of instructions on another thread. For example, thread 1 and thread 2 share the same instruction issue unit. If thread 1 is stalling for many cycles in the instruction unit, then thread 2 will also be stalled for many cycles, since the instruction unit is shared. Thread 1 could be stalling due to a non-pipelined operation being executed, or a dependency waiting many cycles to be cleared. Accordingly, thread 2, which is independent of thread 1, cannot issue instructions and must wait for thread 1. This problem leads to wasted time and resources for thread 2.

One method to handle this problem is to decouple the issue point between threads. This is a valid solution, but it has the drawback of increasing the complexity of issuing instructions and it requires substantial area on the chip. Another method is flushing the instructions at dispatch when a long-latency instruction is detected. This is problematic because the flush-penalty most likely will not match the precise latency of the instruction, which leads to wasted cycles. It is clear that a simple system or method that allows multiple threads sharing the same resources to truly operate independently without wasting cycles would provide a vast improvement over the prior art.

SUMMARY OF THE INVENTION

The present invention provides a method, a computer program product, and an apparatus for fine-grained control of thread performance by blocking a thread at dispatch in a multi-thread processor. Multiple threads share a pipeline within a processor. Therefore, a long latency condition for an instruction on one thread can stall all of the threads that share the pipeline. A long latency condition can be a non-pipelined operation or a dependency. When a compiler can predict this long latency condition, it injects a dispatch-block signaling instruction into the code to block the specific thread. The processor detects this instruction and blocks the thread at dispatch for the number of cycles specified by the instruction (plus any additional cycles the hardware may add if additional latency is detected). The length of the block matches the length of the latency, so the pipeline can dispatch instructions from the blocked thread after the long latency condition is resolved. In one embodiment, the dispatch-block signaling instruction is a modified OR instruction and in another embodiment the instruction is one Nop instruction. The OR instruction and the Nop instruction block a thread for a specific amount of cycles that matches the latency of the condition. The modified OR instruction does not influence the execution of the program, the register file state, the memory state, or the input/output, and it only operates as a dispatch block. By blocking one thread at dispatch, the processor can dispatch instructions from the other threads during the block. This insures that a long latency condition on one thread does not lead to a stall on multiple threads and that the current thread is stalled for the precise number of cycles that is necessary.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
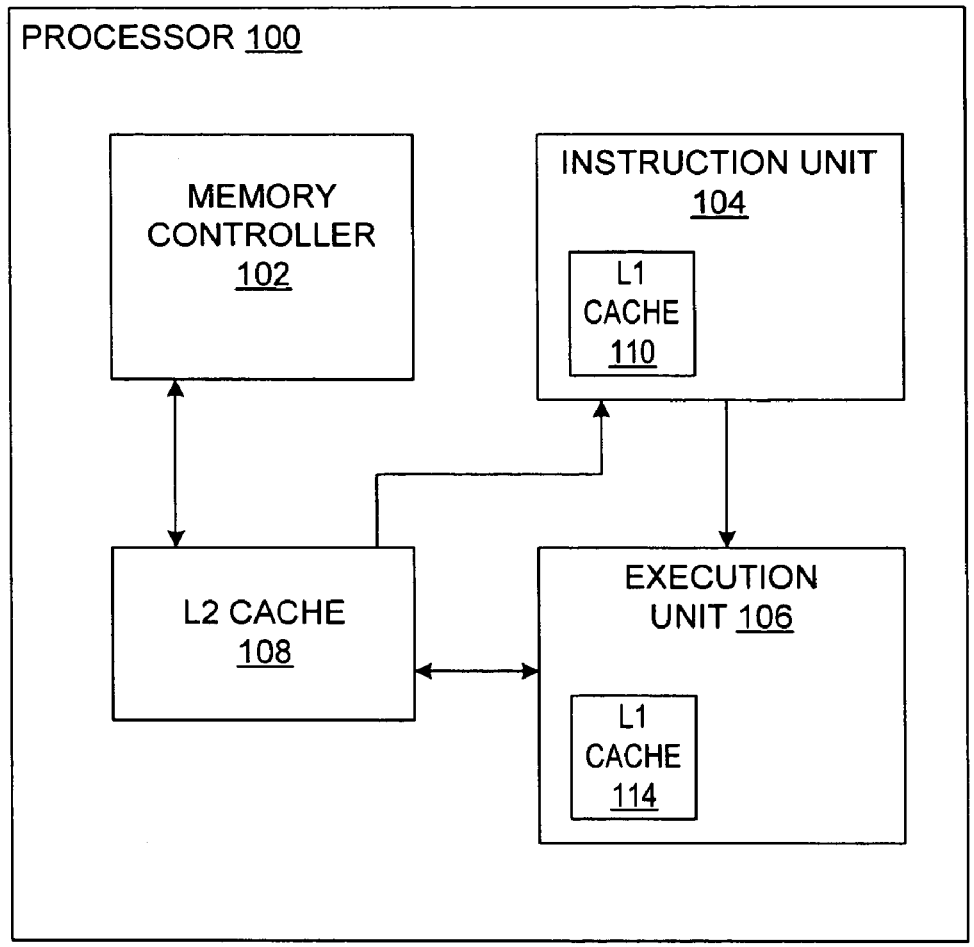
FIG. 1 depicts a block diagram of a processor with multi-thread capabilities.

FIG. 1 depicts a block diagram of a processor 100 with multi-thread capabilities. This processor contains memory controller 102. Memory controller 102 controls the flow of data and instructions to and from the processor 100. Accordingly, instruction unit 104 issues instructions that are sent to execution unit 106. Memory controller 102 interfaces with a level 2 (L2) cache 108. The L2 cache 108 stores both instructions and data. The L2 cache interfaces with separate level 1 (L1) caches on instruction unit 104 and execution unit 106. Instruction unit 104 has an L1 cache 110 to store instructions and execution unit 106 has an L1 cache 114 to store data. Instruction unit 104 draws instructions from L1 cache 110 and execution unit 114 draws data from and writes data to L1 cache 114. Processor 100 may contain many other components that are not shown in FIG. 1. FIG. 1 is a basic representation of a processor and does not limit the scope of the present invention.

Figure 2:
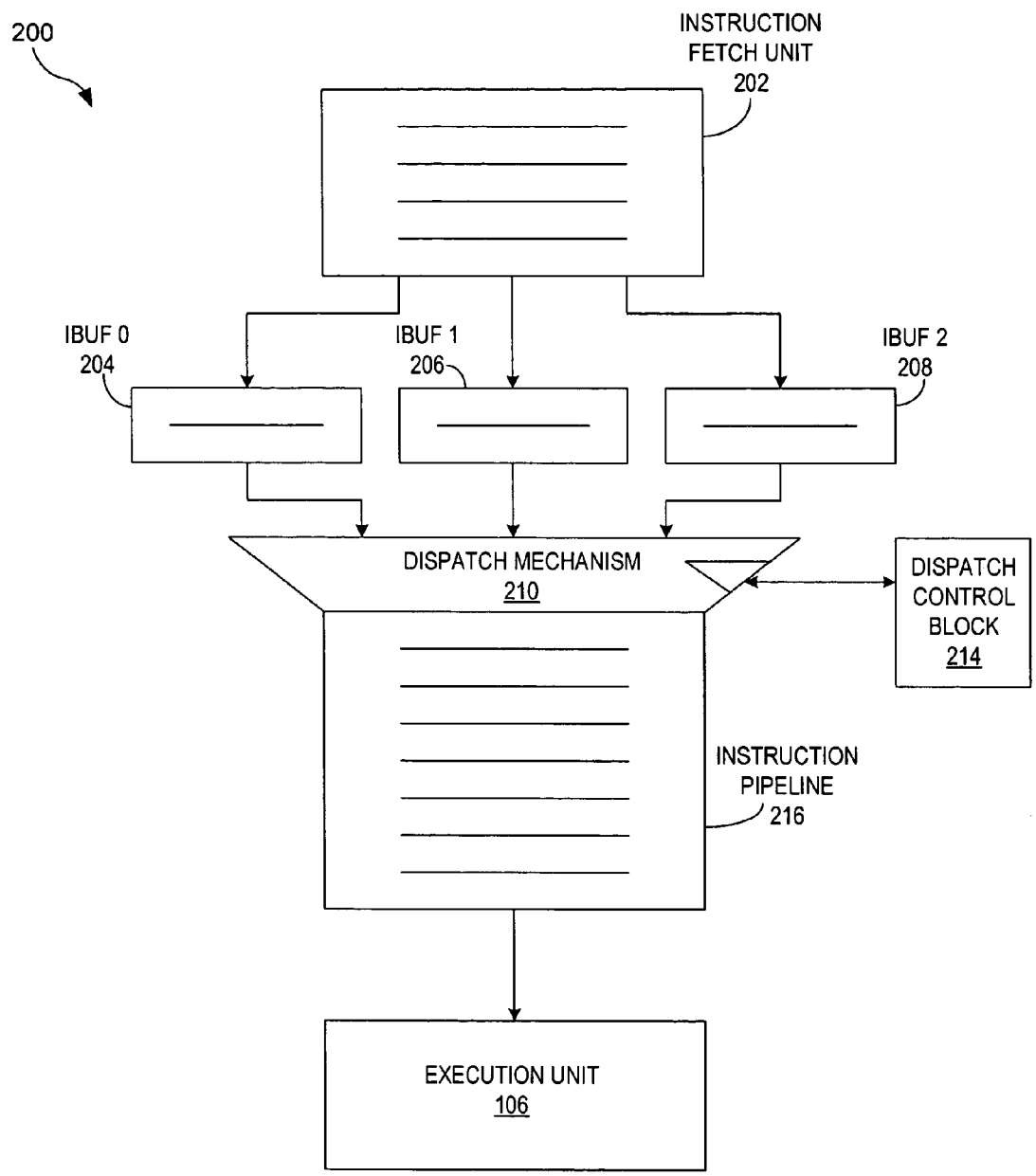
FIG. 2 depicts a block diagram of an instruction pipeline within a processor that can accommodate multiple threads.

FIG. 2 depicts a block diagram of an instruction pipeline 200 within a processor that can accommodate multiple threads. This apparatus 200 resides within instruction unit 104 of FIG. 1, and accommodates three separate threads, thread 0, thread 1, and thread 2 (not shown). As previously described, a thread is a program or a group of instructions that can execute independently. Instruction fetch unit 202 fetches instructions for all three threads. Instruction fetch unit 202 fetches the instructions in a priority order. Normally, instruction fetch unit 202 alternates between the three threads to give each thread equal access to the instruction pipeline. Instruction fetch unit 202 transmits these instructions to instruction buffers. Accordingly, IBUF 0 204 stores instructions for thread 0, IBUF 1 206 stores instructions for thread 1, and IBUF 2 208 stores instructions for thread 2. The instruction buffers 204, 206, and 208 transmit the instructions to dispatch mechanism 210. FIG. 2 illustrates three separate threads, but this number is arbitrary and this type of apparatus 200 can handle a larger or smaller amount of threads.

Dispatch mechanism 210 is a multiplexer ("MUX") that selects the correct instruction for dispatch to instruction pipeline 216. FIG. 2 uses a MUX as dispatch mechanism 210, but other components can be implemented to accomplish the same result. Dispatch mechanism 210 toggles between the output of IBUF 0 204, IBUF 1 206, or IBUF 2 208 to give each thread equal priority and access to instruction pipeline 216. Dispatch control block 214 selects which thread gets dispatched. If dispatch control block 214 detects the modified OR instruction it disrupts the normal toggle mechanism of dispatch mechanism 210. After dispatch, the instructions stage down instruction pipeline 216. Instruction pipeline 216 feeds execution unit 106 from FIG. 1. Execution unit 106 executes the instructions. This application describes the illustrative embodiment with reference to an issue pipeline, and more specifically an instruction pipeline. The embodiment applies to any point in a pipeline where there is resource contention. For example, the embodiment also applies to an execution pipeline.

The illustrative embodiment concerns dispatch mechanism 210, dispatch control block 214, and the compiler (not shown). Consequently, an instruction that leads to a stall for thread 0 also causes a stall for independent threads 1 and 2 because all three threads share instruction pipeline 216. The illustrative embodiment operates a block mechanism at the dispatch point (dispatch mechanism 210) in the pipeline by using a dispatch-block signaling instruction. The compiler controls dispatch mechanism 210 such that it can dispatch instructions from threads 1 and 2, while thread 0 is blocking at dispatch. This allows independent threads 1 and 2 to continue executing instructions in instruction pipeline 216, while thread 0 is blocked at dispatch. This fine-grained thread control of thread performance saves time and resources for this multi-thread processor.

In one embodiment, the compiler executes these dispatch-block signaling instructions by using new forms of the OR instructions that are inserted into the pipeline. These instructions block all instructions on a particular thread at dispatch for a programmable number of cycles, which allows the other threads to access dispatch mechanism 210 during the block of one thread. The special forms of the OR instruction have no effect on the system other than to block the thread at the dispatch point. These OR instructions can be easily decoded and configured to different block times that produce the best results for the compiler. In one embodiment, the compiler can configure the block delay for each of the different decoded instruction types.

In an illustrative embodiment, the dispatch-block signaling instruction is a Nop instruction. A Nop instruction is an instruction that does not influence the execution of the program, register file state, memory state, or input/output. In this embodiment the Nop instruction operates as a dispatch block. There are varying types of Nop instructions, some of which do not block the thread and just do nothing. By designing the Nop instruction to have no effect on the system, processor 100 receives the benefit of not consuming any register resources to request the block. For one example, dispatch control block 214 needs to block thread 0 for 10 cycles. Compiler may dispatch 10 Nop instructions (normal), which prevents instruction pipeline 216 from stalling. This allows threads 1 and 2 to be dispatched during the block. In an embodiment, compiler dispatches one modified Nop instruction that delays thread 0 for 10 cycles. By only issuing one modified Nop instruction the compiler saves time and resources through a smaller code footprint.

There is a priority scheme for dispatch mechanism 210. Accordingly, dispatch mechanism 210 toggles between threads 0, 1, and 2 to provide equal access to the instruction pipeline. In the present invention, a modified Nop (OR) instruction leads dispatch mechanism 210 to ignore the specific thread and toggle between the other threads. For example, a Nop instruction for 10 cycles on thread 1 causes dispatch mechanism 210 to toggle between threads 0 and 2 for 10 cycles. Accordingly, threads 0 and 2 have exclusive access to dispatch mechanism 210 while thread 1 is blocked at dispatch.

As an example of the modified OR instructions, the following OR instructions cause the following dispatch delays.

OR 28,28,28//block for 8 cycles
OR 29,29,29//block for 10 cycles
OR 30,30,30//block for 12 cycles
OR 31,31,31//block for 16 cycles These groups of cycle numbers are arbitrary and only provide an example of the modified OR instructions. The fixed timings for these instructions are programmed into the software. Therefore, when the compiler detects a specific sequence of instructions that will lead to a delay due to stalling the instruction pipeline, it will issue a modified OR instruction to handle the delay. The corresponding OR operation can precisely match the long-latency condition or approximate the long-latency condition. Accordingly, the hardware may add cycles to the OR instruction if additional latency is detected.

Figure 3:
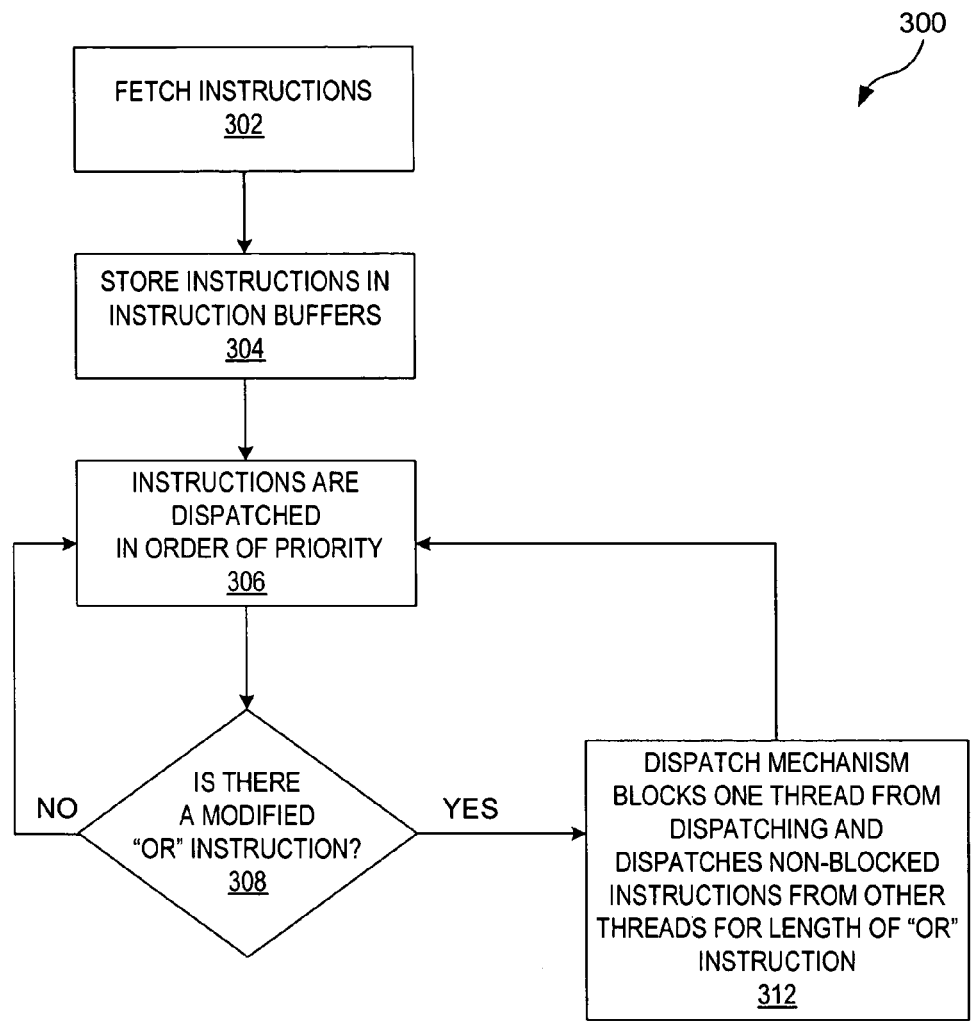
FIG. 3 is a flow chart illustrating the use of a modified dispatch block mechanism within a multi-thread instruction pipeline.

FIG. 3 is a flow chart 300 illustrating the use of this modified dispatch block mechanism within a multi-thread instruction pipeline. First, instruction fetch unit 202 fetches instructions in step 302. Then in step 304, instruction buffers 204, 206 and 208 store the instructions. Dispatch mechanism 210 dispatches non-blocked instructions in order of priority in step 306. As previously described, dispatch mechanism 210 toggles between threads 0, 1, and 2. In step 308 the dispatch mechanism 210 determines whether there is a modified OR instruction. If there is not a modified OR instruction, then in step 306 dispatch mechanism 210 continues to dispatch non-blocked instructions in order of priority. If there is a modified OR instruction, then in step 312 dispatch mechanism 210 blocks the thread from dispatching and allows non-blocked other threads to dispatch instructions for the length of the "OR" instruction. Accordingly, "OR" instructions on multiple threads can cause dispatch mechanism 210 to block multiple threads at the same time. This type of blocking is not limited to one thread at a time.

Figure 4:
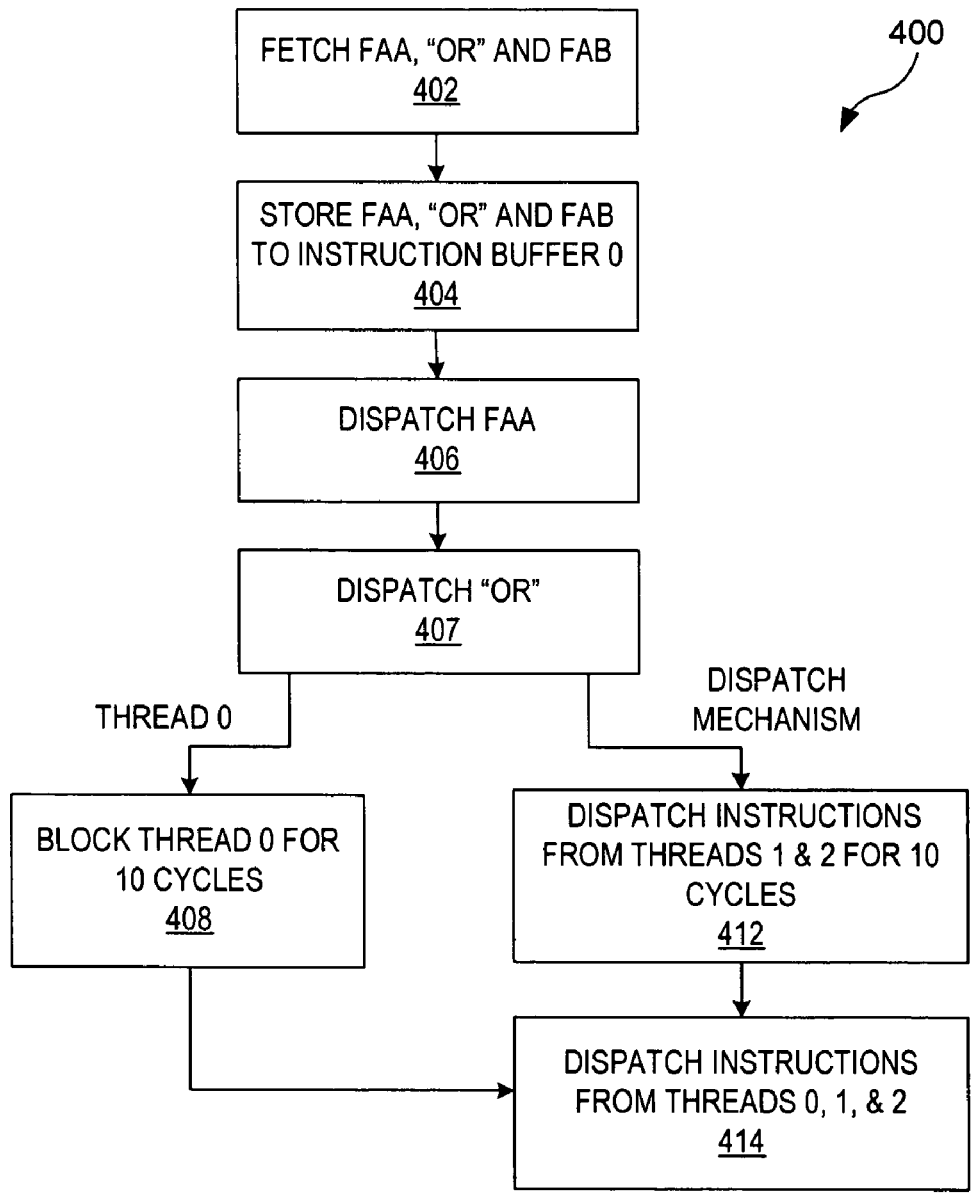
FIG. 4 is a flow chart illustrating an example of a modified OR mechanism that is used to block one thread of a multi-thread instruction pipeline.

FIG. 4 is a flow chart 400 illustrating an example of a modified OR mechanism that is used to block one thread of a multi-thread instruction pipeline. This example involves a floating add instruction ("FAA") followed by another floating add instruction ("FAB") that is dependent upon FAA. These two instructions are on thread 0 from FIG. 2. For this example, thread 0 takes 10 cycles to execute or produce a result. Therefore, dependent operation FAB must stall 10 cycles in instruction pipeline 216 to wait for the dependency to clear. Accordingly, the compiler must know that a floating add instruction followed by a dependent floating add instruction on thread 0 corresponds to the OR instruction OR 29,29,29. The compiler inserts this OR instruction into thread 0. This assumes that dispatch control unit 214 can immediately block dispatch at the presence of one of these modified OR instructions, in time to block dependent instruction FAB. If this is not true and there is a latency before blocking dispatch, then the compiler can put normal Nop instuctions after the modified OR instruction to compensate.

First, instruction issue unit 202 fetches FAA, the modified OR instruction, and FAB in step 402. IBUF 0 204 stores the FAA, the "OR," and the FAB in step 404. FAB follows the OR instruction which follows FAA through instruction fetch unit 202 and IBUF 0 204. Thread 0 has to dispatch FAA in step 406. Then thread 0 dispatches the modified OR instruction in step 407. The OR instruction blocks thread 0 for 10 cycles in step 408, and dispatch control unit 214 enables dispatch mechanism 210 to dispatch instructions from threads 1 and 2 for 10 cycles in step 412. After 10 cycles dispatch mechanism 210 dispatches instructions from threads 0, 1 and 2 in step 414. Threads 1 and 2 are not affected by the OR instruction for thread 0. Actually, threads 1 and 2 are executing faster due to the dispatch block on thread 0.

This modified OR instruction can also be beneficial when one thread has a non-pipelined operation. Non-pipelined instructions usually take a long time to execute and subsequent instructions that use the same resources are not able to be pipelined. Accordingly, the subsequent instructions have to wait until the non-pipelined instruction is finished executing. This causes a significant stall in instruction pipeline 216 and penalizes the other threads. If the compiler knows that such a stall will result, then the compiler can block a thread for a specific number of cycles after dispatching the non-pipelined instruction by using the modified OR instruction. Therefore, the non-pipelined instruction will not indirectly stall instruction pipeline 216. The other threads are able to dispatch and issue as long as the other threads do not use the same resources as the non-pipelined instruction that is currently executing. Many long latency conditions in the instruction pipeline may be avoided by utilizing this modified OR instruction. The ability to issue instructions from multiple threads in a shared issue pipeline even though one thread has a long-latency condition is a clear improvement over the prior art.

Figure 5:
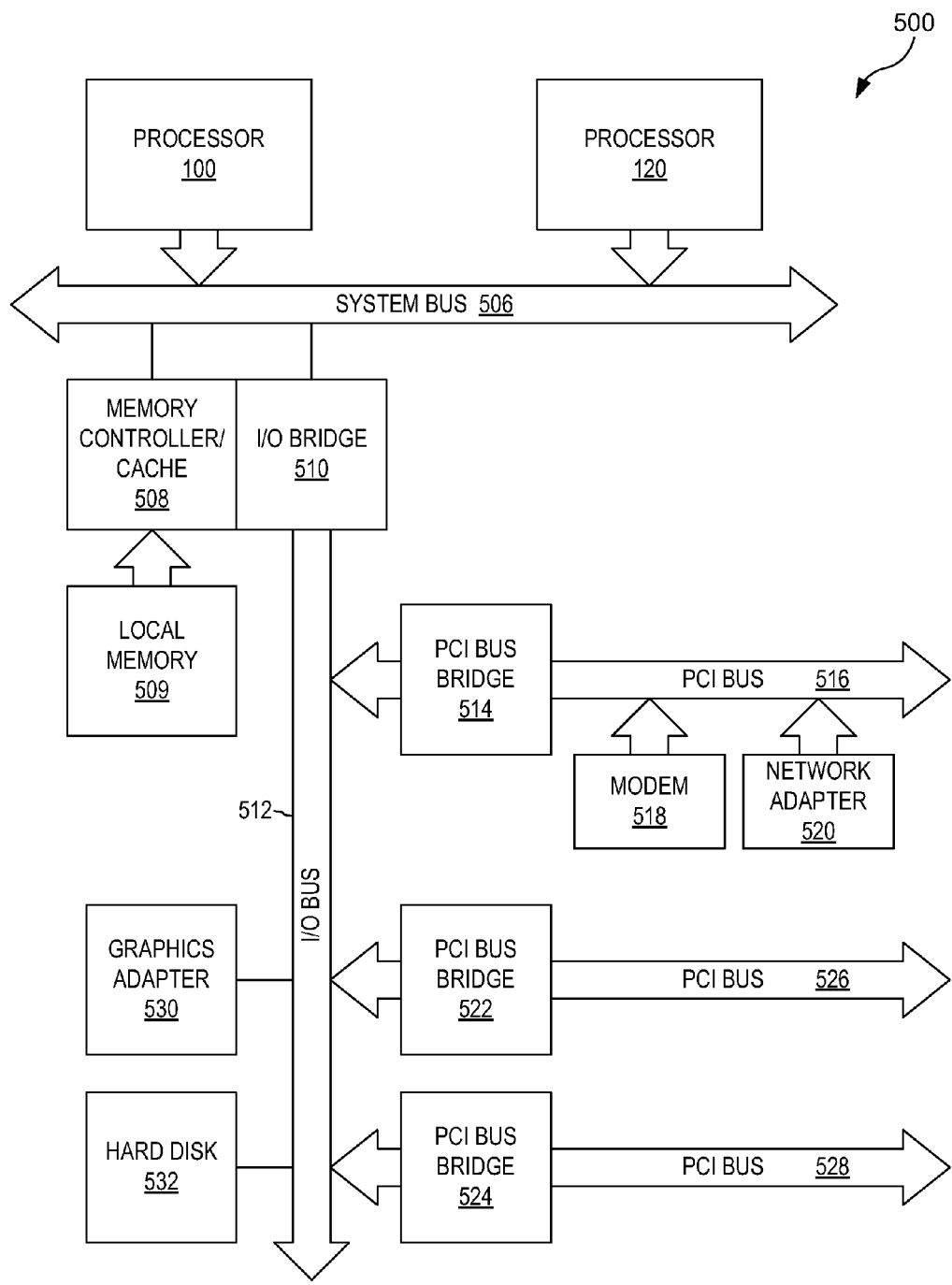
FIG. 5 is a block diagram depicting a data processing system.

FIG. 5 depicts a block diagram of data processing system 500 that may be implemented, for example, as a server, client computing device, handheld device, notebook, or other types of data processing systems, in accordance with an embodiment of the present invention. Data processing system 500 may implement aspects of the present invention, and may be a symmetric multiprocessor ("SMP") system or a non-homogeneous system having a plurality of processors, 100 and 120 connected to the system bus 506. Alternatively, the system may contain a single processor 100.

Memory controller/cache 508 provides an interface to local memory 509 and connects to system bus 506. I/O Bus Bridge 510 connects to system bus 506 and provides an interface to I/O bus 512. Memory controller/cache 508 and I/O Bus Bridge 510 may be integrated as depicted. Peripheral component interconnect ("PCI") bus bridge 514 connected to I/O bus 512 provides an interface to PCI local bus 516. A number of modems may be connected to PCI local bus 516. Typical PCI bus implementations will support four PCI expansion slots or add-in connectors. Modem 518 and network adapter 520 provide communications links to other computing devices connected to PCI local bus 516 through add-in connectors (not shown). Additional PCI bus bridges 522 and 524 provide interfaces for additional PCI local buses 526 and 528, from which additional modems or network adapters (not shown) may be supported. In this manner, data processing system 500 allows connections to multiple network computers. A memory-mapped graphics adapter 530 and hard disk 532 may also be connected to I/O bus 512 as depicted, either directly or indirectly.

Accordingly, the hardware depicted in FIG. 5 may vary. For example, other peripheral devices, such as optical disk drives and the like, also may be used in addition to or in place of the hardware depicted. The depicted example does not imply architectural limitations with respect to the present invention. For example, data processing system 500 may be, for example, an IBM Deep Blue system, CMT-5 system, products of International Business Machines Corporation in Armonk, N.Y., or other multi-core processor systems, running the Advanced Interactive Executive ("AIX") operating system, LINUX operating system, or other operating systems.

It is understood that the present invention can take many forms and embodiments. Accordingly, several variations of the present design may be made without departing from the scope of the invention. The capabilities outlined herein allow for the possibility of a variety of networking models. This disclosure should not be read as preferring any particular networking model, but is instead directed to the underlying concepts on which these networking models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for blocking one thread at a dispatch point of a pipeline in a multi-thread processor, wherein the pipeline is shared by multiple threads, comprising:
    detecting a long latency condition on a first thread within the pipeline;
    determining an exact latency involved with the long latency condition;
    generating a dispatch-block signaling instruction;
    in response to the dispatch-block signaling instruction, blocking the first thread at the dispatch point for an amount of cycles;
    dispatching instructions from other non-blocked threads of the instruction pipeline during the block; and
    dispatching instructions from all of the non-blocked threads of the instruction pipeline after the block.

2. The method of claim 1, wherein the method is used in a computer system or a data processing system.

3. The method of claim 1, wherein the long latency condition is a non-pipelined operation or a dependency.

4. The method of claim 1, wherein the step of determining an exact latency further comprises:
    determining the latency for each possible long latency condition within the pipeline; and
    programming cycle times that correspond to each latency into the multi-thread processor.

5. The method of claim 1, wherein the step of generating a dispatch-block signaling instruction further comprises generating a dispatch-block signaling instruction to block the first thread for an amount of cycles to match the latency.

6. The method of claim 5, wherein the multi-thread processor inserts the dispatch-block signaling instruction into the first thread.

7. The method of claim 6, wherein the dispatch-block signaling instruction is one Nop instruction that blocks the first thread at the dispatch point for the amount of cycles to match the latency.

8. The method of claim 6, wherein the dispatch-block signaling instruction is a modified OR instruction that blocks the first thread at the dispatch point for the amount of cycles to match the latency.

9. The method of claim 1, wherein the pipeline is an instruction pipeline or an execution pipeline.

10. A computer program product for blocking one thread at a dispatch point of a pipeline in a multi-thread processor, wherein the pipeline is shared by multiple threads, with the computer program product having a machine-readable medium with a computer program embodied thereon, wherein the computer program comprises:
    computer code for detecting a long latency condition on a first thread within the pipeline;
    computer code for determining an exact latency involved with the long latency condition;
    computer code for generating a dispatch-block signaling instruction;
    in response to the dispatch-block signaling instruction, computer code for blocking the first thread at the dispatch point for an amount of cycles;
    computer code for dispatching instructions from other non-blocked threads of the instruction pipeline during the block; and
    computer code for dispatching instructions from all of the non-blocked threads of the instruction pipeline after the block.

11. The computer program product of claim 10, wherein the long latency condition is a non-pipelined operation or a dependency.

12. The computer program product of claim 10, determining an exact latency further comprises:
    computer code for determining the latency for each possible long latency condition within the pipeline; and
    computer code for programming the cycle times that correspond to each latency into the multi-thread processor.

13. The computer program product of claim 10, wherein generating a dispatch-block signaling instruction farther comprises computer code for:
    generating a dispatch-block signaling instruction to block the first thread for an amount of cycles to match the latency;
    and inserting the dispatch-block signaling instruction into the first thread.

14. The computer program product of claim 13, wherein the dispatch-block signaling instruction is one Nop instruction that blocks the first thread at the dispatch point for the amount of cycles to match the latency.

15. The computer program product of claim 13, wherein the dispatch-block signaling instruction is a modified OR instruction that blocks the first thread at the dispatch point for an amount of cycles to match the latency.

16. The computer program product of claim 10, wherein the pipeline is an instruction pipeline or an execution pipeline.

17. An apparatus for blocking one thread at a dispatch point of a pipeline in a multi-thread processor, wherein the pipeline is shared by multiple threads, comprising:
    a dispatch mechanism coupled to the pipeline that is at least configured to dispatch instructions from multiple threads;
    a compiler that is at least configured to:
        detect a long latency condition on a first thread within the instruction pipeline;
        determine the latency involved with the long latency condition;
        generate a dispatch-block signaling instruction to block the first thread at the dispatch point for the amount of cycles matching the latency;
        insert the dispatch-block signaling instruction into the pipeline; and
    a dispatch control block coupled to the dispatch mechanism and the compiler that is at least configured to:
        block the dispatch of instructions on the first thread in response to the dispatch-block signaling instruction; and
        enable the dispatch of instruction on all of the non-blocked threads after the amount of cycles matching the latency.

18. The apparatus of claim 17, wherein the multi-thread processor resides within a computer system or a data processing system.

19. The apparatus of claim 17, wherein the dispatch-block signaling instruction is one Nop instruction that blocks the first thread for the amount of cycles to match the latency.

20. The apparatus of claim 17, wherein the dispatch-block signaling instruction is a modified OR instruction that blocks the first thread for the amount of cycles to match the latency.

* * * * *